US008856499B1

(12) United States Patent
Toksvig et al.

(10) Patent No.: US 8,856,499 B1
(45) Date of Patent: Oct. 7, 2014

(54) REDUCING INSTRUCTION EXECUTION PASSES OF DATA GROUPS THROUGH A DATA OPERATION UNIT

(75) Inventors: Michael J. M. Toksvig, Palo Alto, CA (US); Justin M. Mahan, Fremont, CA (US); Edward A. Hutchins, Mountain View, CA (US); Tyson J. Bergland, Palo Alto, CA (US); James T. Battle, Austin, TX (US); Ashok Srinivasan, Palo Alto, CA (US)

(73) Assignee: Nvidia Corporation, Santa Clara, CA (US)

(*) Notice: Subject to any disclaimer, the term of this patent is extended or adjusted under 35 U.S.C. 154(b) by 979 days.

(21) Appl. No.: 11/893,615

(22) Filed: Aug. 15, 2007

(51) Int. Cl.
*G06F 15/00* (2006.01)
*G06F 7/38* (2006.01)
*G06F 9/44* (2006.01)
*G06F 9/00* (2006.01)

(52) U.S. Cl.
USPC .......................................................... 712/241

(58) Field of Classification Search
USPC .................................................. 712/241, 243
See application file for complete search history.

(56) References Cited

U.S. PATENT DOCUMENTS

| 6,421,701 | B1* | 7/2002 | Elnozahy ........................ 718/100 |
| 6,704,857 | B2* | 3/2004 | Barry et al. .................... 712/215 |
| 2006/0206695 | A1* | 9/2006 | Proujansky-Bell ........... 712/221 |
| 2007/0288553 | A1* | 12/2007 | Donaghey et al. ............. 709/203 |

* cited by examiner

*Primary Examiner* — Corey S Faherty

(57) ABSTRACT

An apparatus is disclosed. The apparatus comprises an instruction mapping table, which includes a plurality of instruction counts and a plurality of instruction pointers each corresponding with one of the instruction counts. Each instruction pointer identifies a next instruction for execution. Further, each instruction count specifies a number of instructions to execute beginning with the next instruction. The apparatus also has a data operation unit adapted to receive a data group and adapted to execute on the received data group the number of instructions specified by a current instruction count of the instruction mapping table beginning with the next instruction identified by a current instruction pointer of the instruction mapping table before proceeding with another data group.

16 Claims, 4 Drawing Sheets

| PASS | DATA GROUP | INSTRUCTION PERFORMED |
|---|---|---|
| PASS 0 | DATA GROUP 0 | VLIW 0 |
| PASS 0 | DATA GROUP 1 | NOP |
| PASS 1 | DATA GROUP 0 | VLIW 3, VLIW 4 |
| PASS 1 | DATA GROUP 1 | VLIW 5 |
| PASS 2 | DATA GROUP 0 | VLIW 6 |
| PASS 2 | DATA GROUP 1 | VLIW 6 |

FIG. 3

REDUCING INSTRUCTION EXECUTION PASSES OF DATA GROUPS THROUGH A DATA OPERATION UNIT

FIELD OF THE INVENTION

The present invention is generally related to programming graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data. Generally, the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

In modern real-time 3-D graphics rendering, the functional units of the GPU need to be programmed in order to properly execute many of the more refined pixel shading techniques. These techniques require, for example, the blending of colors into a pixel in accordance with factors in a rendered scene which affect the nature of its appearance to an observer. Such factors include, for example, fogginess, reflections, light sources, and the like. In general, several graphics rendering programs (e.g., small specialized programs that are executed by the functional units of the GPU) influence a given pixel's color in a 3-D scene. Such graphics rendering programs are commonly referred to as shader programs, or simply shaders. In more modern systems, some types of shaders can be used to alter the actual geometry of a 3-D scene (e.g., Vertex shaders) and other primitive attributes.

Shader instructions are often executed on groups of data. Often, there are many data groups and many instructions to be executed on these data groups. In certain applications, the particular instructions executed on and the number of instructions executed on each data group varies. That is, instruction A may be executed on data group 1 while instruction B may be executed on data group 2. Moreover, three instructions may be executed on data group 7 while one instruction may be executed on data group 10.

This variability is taken into account in designing digital hardware. The goal is to optimize the digital hardware for the particular application. That is, certain performance factors (e.g., configurability, flexibility, speed, area, power, etc.) are emphasized in some applications while other performance factors are emphasized in other applications. Moreover, the environment (e.g., streaming, non-streaming, etc.) also impacts the design of the digital hardware.

SUMMARY OF THE INVENTION

Embodiments of the present invention provide a graphics architecture that implements a shader program loading and execution process that can scale as graphics application needs require and provide added performance without incurring penalties such as increased processor overhead.

In one embodiment, the present invention is implemented as an apparatus comprising an instruction mapping table, which includes a plurality of instruction counts and a plurality of instruction pointers each corresponding with one of the instruction counts. Each instruction pointer identifies a next instruction for execution. Further, each instruction count specifies a number of instructions to execute beginning with the next instruction. The apparatus also has a data operation unit adapted to receive a data group and adapted to execute on the received data group the number of instructions specified by a current instruction count of the instruction mapping table beginning with the next instruction identified by a current instruction pointer of the instruction mapping table before proceeding with another data group.

BRIEF DESCRIPTION OF THE DRAWINGS

The present invention is illustrated by way of example, and not by way of limitation, in the Figures of the accompanying drawings and in which like reference numerals refer to similar elements.

FIG. 3 illustrates operation of the apparatus of FIG. 1 in accordance with an embodiment of the present invention.

DETAILED DESCRIPTION OF THE INVENTION

Figure 1:
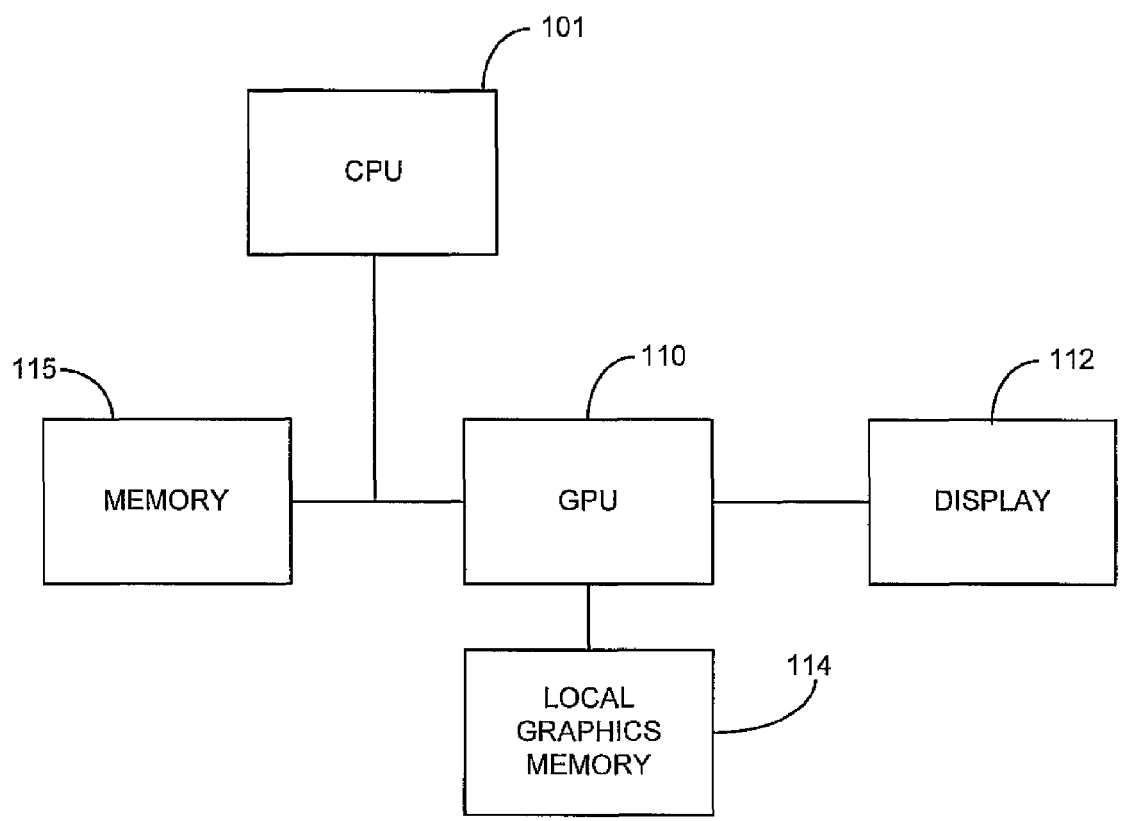
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown), or within the integrated circuit die of a PSOC (programmable system-on-a-chip). Additionally, a local graphics memory 114 can be included for the GPU 110 for high bandwidth graphics data storage.

EMBODIMENTS OF THE INVENTION

Figure 2:
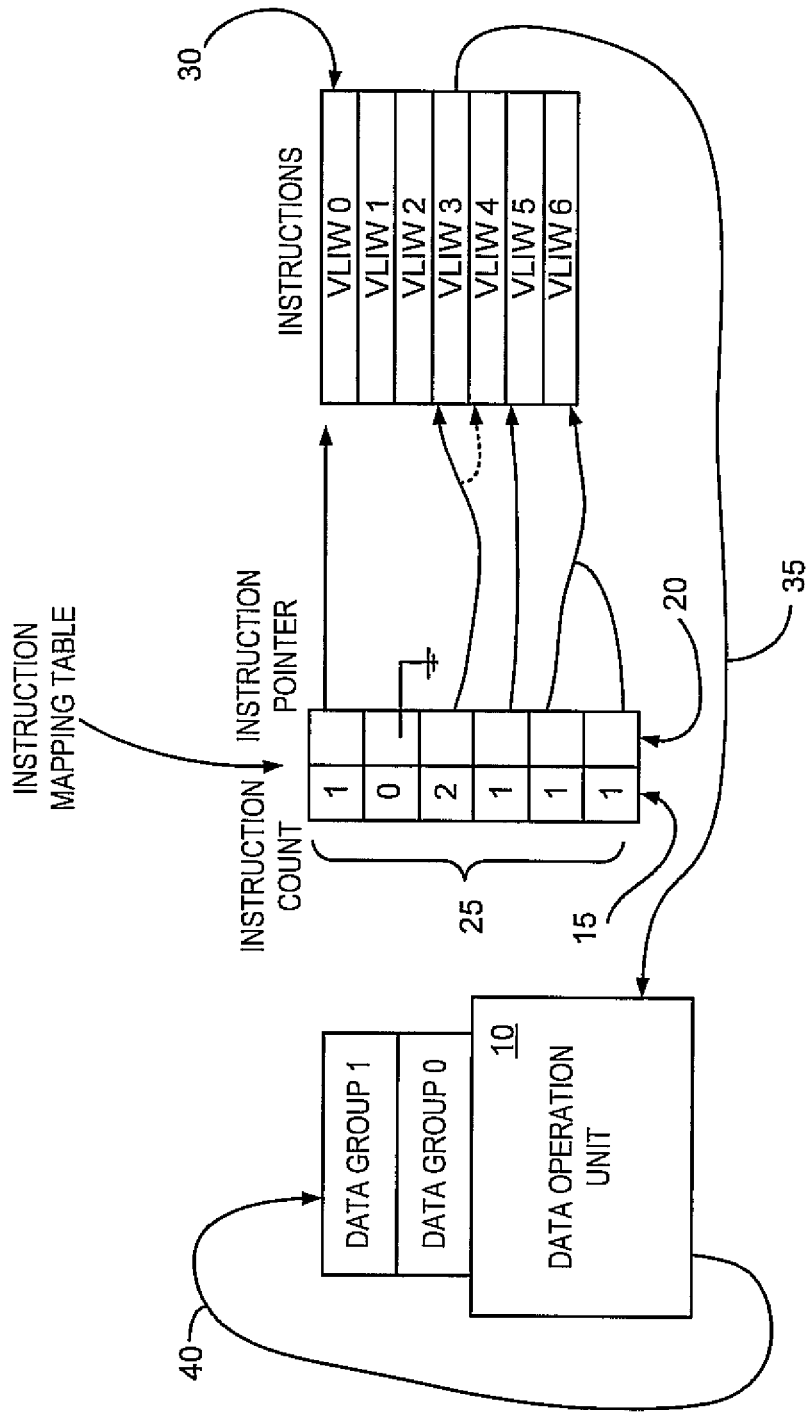
FIG. 2 illustrates an apparatus in accordance with an embodiment of the present invention.

FIG. 2 illustrates an apparatus 200 in accordance with an embodiment of the present invention. Although the discussion will focus on instructions that are very long instruction words (VLIW), it should be understood that the invention is equally applicable to other types of instructions.

As depicted in FIG. 2, the apparatus 200 includes a data operation unit 10 and an instruction mapping table 25. The data operation unit 10 executes instructions 30 on a data group (e.g., data group 0, data group 1). It should be understood that there may be any number of data groups and any number of data operation units arranged in a sequential manner. The instructions 30 are sent to the data operation unit 10 via line 35. Moreover, line 40 enables data groups to be resent through the data operation unit 10. In an embodiment, the data group is received in a streaming manner. The instruction mapping table 25 provides program counter functionality by determining what instruction(s), if any, to execute on the data group and when to execute the instruction(s), if any, on the data group.

The apparatus 200 is well suited for executing instructions on data groups representing pixel data. Moreover, the apparatus 200 may be a pixel processing device such as a central processing unit (CPU), a graphics processing unit (GPU), a graphics card, a portable video device, or any other type of pixel processing device.

In an embodiment, the instruction mapping table 25 including a plurality of instruction counts 15 and a plurality of instruction pointers 20 each corresponding with one of the instruction counts 15. That is, there are a plurality of instruction count 15 and instruction pointer 20 pairs. Each instruction pointer 20 identifies a next instruction, if any, for execution by the data operation unit 10. Each instruction count 15 specifies a number of instructions to execute beginning with the next instruction specified by its corresponding instruction pointer 20.

For example, the instruction count 15 having the value 1 indicates that one instruction (e.g., the next instruction) will be executed while the instruction count 15 having the value 3 indicates that three instructions (e.g., the next instruction (assuming VLIW 2) and two instructions (VLIW 3 and VLIW 4) after the next instruction (VLIW 2)) will be executed. The instruction count 15 having the value 0 indicates that no instruction (nop) will be executed and its corresponding instruction pointer 20 will not identify the next instruction for execution.

The data operation unit 10 is adapted to receive a data group (e.g., data group 0) and is adapted to execute on the received data group the number of instructions specified by a current instruction count 15 of the instruction mapping table 25 beginning with the next instruction identified by a current instruction pointer 20 of the instruction mapping table 25 before proceeding with another data group (e.g., data group 0). That is, the data operation unit 10 executes on the received data group (e.g., data group 0) a number of instructions specified by a current instruction count 15 and instruction pointer 20 pair beginning with a next instruction identified by the current instruction count 15 and instruction pointer 20 pair.

In an embodiment, the current instruction count 15 and the current instruction pointer 20 are determined by advancing through the instruction mapping table 25 from the top to the bottom in response to the data operation unit 10 receiving a data group for an execution pass.

The apparatus 200 has several advantages. First, use of the current instruction count 15 avoids need for resending the data group through the data operation unit 10 for each of the number of instructions specified by the current instruction count 20. This is illustrated in FIG. 2. That is, for the current execution pass, the currently required instructions are performed on the relevant data group (e.g., data group 0) without resending the data group through the data operation unit 10 to complete the current execution pass. Then, the data operation unit 10 proceeds with the current execution pass for another data group (e.g., data group 1). Since additional power is utilized to resend the data group through the data operation unit 10, there is a reduction in power use by eliminating the resending of data through the data operation unit 10.

Further, the ability to execute multiple instructions on the data group enables performance of more complex instructions from simpler building block instructions. That is, once the data group is available to the data operation unit 10, as much instructions are performed as currently required by the instruction mapping table 25.

FIG. 3 illustrates operation of the apparatus 200 of FIG. 2 in accordance with an embodiment of the present invention. As depicted in FIG. 3, the instruction mapping table 25 facilitates execution passes Pass 0, Pass 1, and Pass 2 for data group 0 and data group 1 through the data operation unit 10. It should be understood that the instruction mapping table 25 may be configured to facilitate any number of execution passes and any number of data groups. In general, the size of the instruction mapping table 25 is dependent on the number desired passes and the number of data groups. Here, the instruction mapping table 25 has six rows to handle Pass 0, Pass 1, and Pass 2 for data group 0 and data group 1.

In Pass 1, the instructions VLIW 3 and VLIW 4 are executed on data group 0 without resending the data group 0 through the data operation unit 10, saving power and enabling execution of a more complex instruction from instructions VLIW 3 and VLIW 4. In Pass 0, no instruction (nop) is executed on data group 1.

Figure 4:
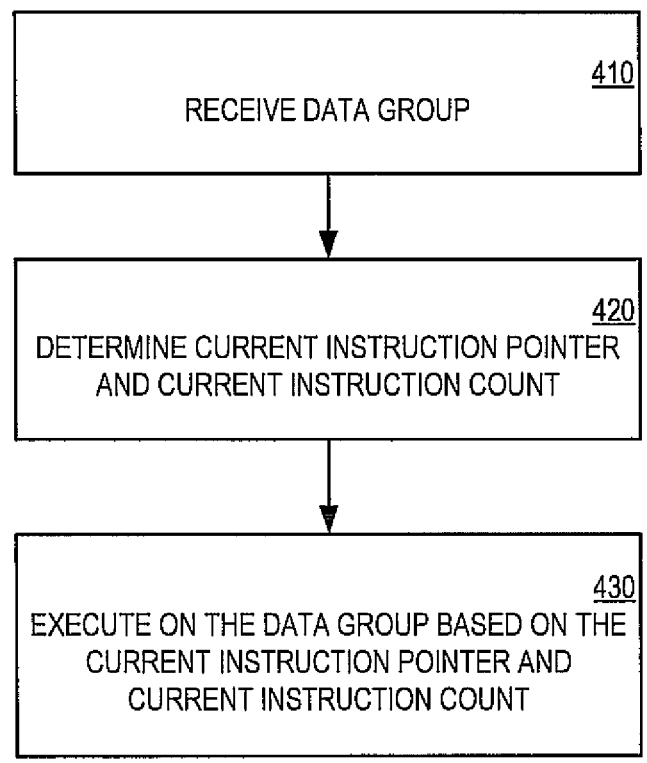
FIG. 4 illustrates a flow chart showing a method of executing instructions on data groups in accordance with an embodiment of the present invention.

FIG. 4 illustrates a flow chart showing a method 400 of executing instructions on data groups in accordance with an embodiment of the present invention. Reference is made to FIGS. 2 and 3.

At Block 3410, the data operation unit 10 receives a data group (e.g., data group 0) of the data groups (e.g., data group 0, data group 1). In an embodiment, the data group 0 is received in a streaming manner.

Continuing, at Block 420, a current instruction pointer 20 that identifies a next instruction for execution and a current instruction count 15 that specifies a number of instructions to execute beginning with the next instruction, are determined from the instruction mapping table 25 for the current execution pass. As an example, the current state of the instruction mapping table 25 is at Pass 2 for data group 0 (or row 5 of the instruction mapping table 25). That is, the current instruction count 15 has the value 1 and the current instruction pointer 20 identifies the next instruction VLIW 5 for Pass 2 for data group 0.

Further, at Block 430, in Pass 2 the data operation unit 10 executes on the received data group 0 the number of instructions (1) specified by the current instruction count 15 beginning with the next instruction (VLIW 5) identified by the current instruction pointer 20 before proceeding with data group 1. Refer to FIG. 2.

The method 400 is well suited for executing instructions on data groups representing pixel data. Moreover, the method 400 may be implemented in a pixel processing device such as a central processing unit (CPU), a graphics processing unit (GPU), a graphics card, a portable video device, or any other type of pixel processing device.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus comprising:
an instruction mapping table comprising a plurality of instruction counts and a plurality of instruction pointers each pointer corresponding with one of said instruction counts, wherein each instruction pointer identifies a next instruction for execution, wherein each instruction count specifies a number of instructions to execute beginning with said next instruction; and
a data operation unit adapted to receive a data group and adapted to execute on said received data group said number of instructions specified by a current instruction count of said instruction mapping table beginning with said next instruction identified by a current instruction pointer of said instruction mapping table before proceeding with another data group, wherein said instructions comprise very long instruction words (VLIW), wherein said current instruction count and said current instruction pointer are determined in accordance with advancing through said instruction mapping table responsive to the data operation unit receiving a data group for execution.

2. The apparatus as recited in claim 1 wherein no instruction execution is represented by said current instruction count being zero and said current instruction pointer not identifying said next instruction for execution.

3. The apparatus as recited in claim 1 wherein said current instruction count obviates resending said data group through said data operation unit for each of said number of instructions specified by said current instruction count.

4. The apparatus as recited in claim 1 wherein said data group comprises pixel data.

5. The apparatus as recited in claim 1 wherein said instruction mapping table and said data operation unit are parts of a pixel processing device.

6. An apparatus comprising:
a data operation unit adapted to receive a data group and adapted to execute any received instruction on said received data group before proceeding with another data group; and
a plurality of instruction count and instruction pointer pairs, wherein said data operation unit executes on said received data group a number of instructions specified by a current instruction count and instruction pointer pair beginning with a next instruction identified by said current instruction count and instruction pointer pair, wherein said instruction comprises a very long instruction word (VLIW)), wherein said current instruction count and said current instruction pointer are determined in accordance with advancing through said instruction mapping table responsive to the data operation unit receiving a data group for execution.

7. The apparatus as recited in claim 6 wherein no instruction execution is represented by said current instruction count and instruction pointer pair specifying a zero number of instructions and said current instruction count and instruction pointer pair not identifying said next instruction for execution.

8. The apparatus as recited in claim 6 wherein said current instruction count and instruction pointer pair obviates resending said data group through said data operation unit for each of said number of instructions specified by said current instruction count and instruction pointer pair.

9. The apparatus as recited in claim 6 wherein said data group comprises pixel data.

10. The apparatus as recited in claim 6 wherein said instruction mapping table and said data operation unit are parts of a pixel processing device.

11. A method of executing instructions on data groups, said method comprising:
receiving a data group of said data groups;
determining a current instruction pointer that identifies a next instruction for execution and a current instruction count that specifies a number of instructions to execute beginning with said next instruction; and
executing on said received data group said number of instructions specified by said current instruction count beginning with said next instruction identified by said current instruction pointer before proceeding with another data group, wherein said instructions comprise very long instruction words (VLIW), wherein said determining comprises advancing through an instruction mapping table including a plurality of instruction counts and a plurality of instruction pointers each corresponding with one of said instruction counts in response to said received data group.

12. The method as recited in claim 11 wherein no instruction execution is represented by said current instruction count being zero and said current instruction pointer not identifying said next instruction for execution.

13. The method as recited in claim 11 wherein said executing is performed by a data operation unit, and wherein said current instruction count avoids need for resending said data group through said data operation unit for each of said number of instructions specified by said current instruction count.

14. The method as recited in claim 11 wherein said data group comprises pixel data.

15. The method as recited in claim 11 wherein said receiving, determining, and executing are performed by a pixel processing device.

16. The method as recited in claim 11, wherein the very long instruction words (VLIW) operate on pixel data of a pixel processing device.

\* \* \* \* \*